(12) United States Patent
Abe

(10) Patent No.: US 9,902,269 B2
(45) Date of Patent: Feb. 27, 2018

(54) COMMUNICATION METHOD

(71) Applicant: DENSO CORPORATION, Kariya, Aichi-pref. (JP)

(72) Inventor: Taiji Abe, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 139 days.

(21) Appl. No.: 14/965,927

(22) Filed: Dec. 11, 2015

(65) Prior Publication Data

US 2016/0167537 A1 Jun. 16, 2016

(30) Foreign Application Priority Data

Dec. 16, 2014 (JP) ................. 2014-253731

(51) Int. Cl.
*H02J 7/04* (2006.01)
*H02J 7/16* (2006.01)
(Continued)

(52) U.S. Cl.
CPC ........... *B60L 1/003* (2013.01); *B60L 11/1803* (2013.01); *B60L 11/184* (2013.01); *B60L 11/1818* (2013.01); *B60L 11/1824* (2013.01); *B60L 11/1842* (2013.01); *B60L 11/1844* (2013.01); *B60L 11/1846* (2013.01); *B60L 11/1848* (2013.01); *B60L 11/1861* (2013.01); *B60L 11/1868* (2013.01); *B60L 2210/10* (2013.01); *B60L 2210/20* (2013.01); *B60L 2210/30* (2013.01); *B60L 2240/547* (2013.01); *B60L 2240/549* (2013.01); *B60L 2240/70* (2013.01); *Y02E 60/721* (2013.01); *Y02T 10/7005* (2013.01); *Y02T 10/7044* (2013.01); *Y02T 10/7066* (2013.01); *Y02T 10/7072* (2013.01); *Y02T 10/725* (2013.01); *Y02T 10/7216* (2013.01); *Y02T 10/7241* (2013.01);
(Continued)

(58) Field of Classification Search
CPC ........... Y02E 60/12; H02J 7/14; H02J 7/0068; H01M 10/441; H01M 10/44
USPC .......................................... 320/162
See application file for complete search history.

(56) References Cited

U.S. PATENT DOCUMENTS

| 5,462,439 A * | 10/1995 | Keith ................. B60L 1/08 |
| | | 180/279 |
| 2008/0051949 A1 * | 2/2008 | Seo .................. B60K 6/46 |
| | | 701/22 |

(Continued)

FOREIGN PATENT DOCUMENTS

WO   WO-2011/125214 A1   10/2011

*Primary Examiner* — Arun Williams
(74) *Attorney, Agent, or Firm* — Harness, Dickey & Pierce, P.L.C.

(57) ABSTRACT

A method of communication between a power supply station and an electric vehicle is provided. In the method, the electric vehicle prepares a first information represented by a numerical value to be transmitted to the power supply station and transmits the first information by causing an AC power, which the electric vehicle draws from the power supply station, to have a current value corresponding to the first information based on a predetermined correspondence relationship. The power supply station receives the first information based on a magnitude of the current drawn by the electric vehicle and the first predetermined correspondence relationship.

8 Claims, 5 Drawing Sheets

(51) Int. Cl.
 *B60L 1/00* (2006.01)
 *B60L 11/18* (2006.01)
(52) U.S. Cl.
 CPC .......... *Y02T 10/7291* (2013.01); *Y02T 90/121* (2013.01); *Y02T 90/127* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 10/126* (2013.01); *Y04S 30/14* (2013.01)

(56) References Cited

U.S. PATENT DOCUMENTS

| | | | |
|---|---|---|---|
| 2009/0313098 A1* | 12/2009 | Hafner | B60L 8/003 |
| | | | 705/14.1 |
| 2013/0124005 A1 | 5/2013 | Ichikawa | |
| 2014/0055090 A1* | 2/2014 | Krause | B60L 11/182 |
| | | | 320/108 |

* cited by examiner

COMMUNICATION METHOD

CROSS REFERENCE TO RELATED APPLICATION

The present application is based on Japanese Patent Application No. 2014-253731 filed on Dec. 16, 2014, disclosure of which is incorporated herein by reference.

TECHNICAL FIELD

The present disclosure relates to a method of communication between a power supply station and an electric vehicle.

BACKGROUND

In recent years, an electric vehicle, which includes a battery and an electric motor and travels with electric power, is beginning to spread. The electric power needed for the electric vehicle to travel is supplied from the power supply station installed in a public facility or the like and the supplied electric power is stored in the battery of the electric vehicle.

It is proposed in, for example, WO2011/125214A, that the electric power stored in the battery of the electric vehicle is supplied to a building via the power supply station.

When the power supply station and the electric vehicle are connected via a cable and when the electric power is supplied to the electric vehicle (this electric power supply is called herein "charging") or the electric power is supplied to the building (this electric power supply is called herein "discharging"), it is required to perform communication between the power supply station and the electric vehicle in addition to connecting the power supply station and the electric vehicle via the cable.

For example, in the charging, a signal indicating an upper limit of current may be transmitted from the power supply station to the electric vehicle. A charging permission signal for permitting electric power output may be transmitted from the electric vehicle to the power supply station. Additionally, a signal indicating a connecting state of the cable may be transmitted bidirectionally. A communication method for transmitting these signals is specified as a CPLT (control pilot) communication standard.

With regard to communication between the power supply station and the electric vehicle in the discharging, no standard is specified up to now. WO2011/125214A proposes a concrete example of the communication method in the discharging.

SUMMARY

In the charging or the discharging, it may be preferable to transmit and receive a large amount of other information in addition to the above upper limit of current or the like. For example, if information concerning a state of charge (SOC) of the battery is transmitted from the electric vehicle to the power supply station, it becomes possible to perform the charging in a manner that can reduce the load on the battery. If information concerning the electric power cost (e.g., a time left until electricity rate (prices) is changed to high) is transmitted from the power supply station to the electric vehicle, it becomes possible to perform the charging in a more economical manner.

However, a method following the CPLT communication standard cannot transmit the above additional information. The communication method proposed in WO2011/125214A may allow transmission of more information but it uses a voltage value that is never generated in the CPLT communication standard. That is, the communication method proposed in WO2011/125214A conflicts with the existing CPLT communication standard. Therefore, in order to adopt the communication method proposed in WO2011/125214A, a large change to the existing standard is required.

In view of the foregoing, it is an object of the present disclosure to provide a communication method that can transmit more information without conflicting with the existing CPLT communication standard.

In a first aspect of the present disclosure, a method of communication between a power supply station and an electric vehicle comprises: performing a first preparation in which the electric vehicle prepares a first information represented by a numerical value to be transmitted to the power supply station; performing a first transmission in which the electric vehicle transmits the first information by causing an AC power, which the electric vehicle draws from the power supply station, to have a current value corresponding to the first information based on a predetermined first correspondence relationship; and performing a first reception in which the power supply station receives the first information based on a magnitude of the current drawn by the electric vehicle and the first correspondence relationship.

According to the above method of communication, the electric vehicle can transmit the information to the power supply station by changing the magnitude of current that the electric vehicle draws from the power supply station. The magnitude of the drawn current can be freely changed by the electric vehicle in a range whose upper limit is set by the power supply station. Accordingly, even when the magnitude of the current is changed for the communication, no conflict with the existing CPLT communication standard occurs.

An idea of the above method of communication is directed to communications performed when the power supply station supplies electric power to the electric vehicle (i.e., when the charging is performed). This idea is also applicable to communications performed when the electric vehicle supplies electric power to the power supply station (i.e., when the discharging is performed). Specifically, in a second aspect of the present disclosure, a method of communication between a power supply station and an electric vehicle comprises: performing a first preparation in which the power supply station prepares a first information represented by a numerical value to be transmitted to the electric vehicle; performing a first transmission in which the power supply station transmits the first information by causing an AC power, which the power supply station draws from the electric vehicle, to have a current value corresponding to the first information based on a predetermined first correspondence relationship; and performing a first reception in which the electric vehicle receives the first information based on a magnitude of the current drawn by the power supply station and the first correspondence relationship.

BRIEF DESCRIPTION OF THE DRAWINGS

The above and other objects, features and advantages of the present disclosure will become more apparent from the below-described detailed description made with reference to the accompanying drawings, in which.

DETAILED DESCRIPTION

Embodiments will be described with reference to the drawings. In the below description and the drawings, like references are used to refer to like parts and redundant description may be omitted.

Figure 1:
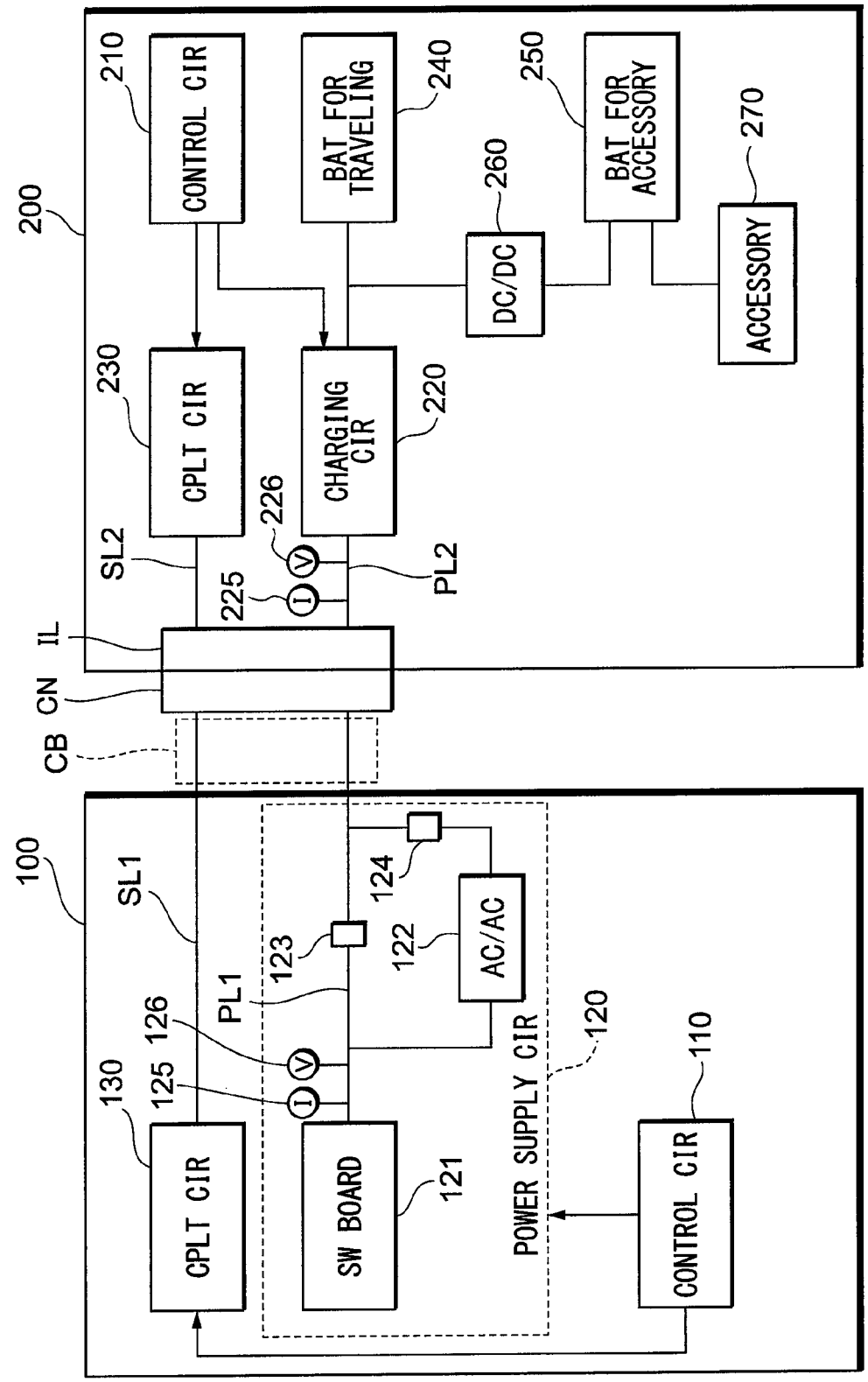
FIG. 1 is a diagram schematically illustrating an electric vehicle and a power supply station which perform a communication method of an embodiment.

FIG. 1 schematically illustrates an outline configuration of a power supply station 100 and an electric vehicle 200 connected via a cable CB. The present embodiment is directed to a communication method between the power supply station 100 and the electric vehicle 200. Prior to describing the communication method, a configuration of the power supply station 100 and a configuration of the electric vehicle 200 will be described.

The power supply station 100 acts as a facility for supplying AC power to the electric vehicle 200 to charge the electric vehicle 200. The power supply station 100 may be installed at an outdoor place near a building (not shown). Electric power supplied from the power supply station 100 via the cable CB is stored in a battery 240 (i.e., a battery for traveling) of the electric vehicle 200.

The power supply station 100 is further capable of being supplied with AC power from the electric vehicle 200 and supplying this power to a building. In the above, the electric power stored in the battery 240 of the electric vehicle 200 is supplied to the power supply station 100 via the cable CB and then supplied from the power supply station 100 to the building. In these ways, the power supply station 100 can bidirectionally exchange the AC power with the electric vehicle 200.

In the below description, the term "charging" may refer to supplying electric power from the power supply station 100 toward the electric vehicle 200. The term "discharging" may refer to supplying electric power from the electric vehicle 200 toward the power supply station 100.

The power supply station 100 includes a control circuit 110, a power supply circuit 120, a CPLT circuit 130 and a cable CB.

The control circuit 110 may be a computer system including a CPU, a ROM, a RAM and an input/output interface. The control circuit 110 controls generally all operations of the power supply station 100.

The power supply circuit 120 outputs AC power toward the electric vehicle 200 when the charging is performed. When the discharging is performed, the power supply circuit 120 receives AC power from the electric vehicle 200. The power supply circuit 120 includes a switchboard 121, a converter 122, and relays 123, 124.

The switchboard 121 is connected to an electric power system. The power line PL1 is provided for AC power exchange with the electric vehicle 200. One end of the power line PL1 is connected to the switchboard 121. A part of the power line PL1 is received in an inside of the capable CB. The other end of the power line PL1 is received in an inside of a connector CN. The power line PL1 has multiple conducting wires. In FIG. 1, the power line PL1 is depicted as a single line for simplicity.

The switchboard 121 is connected to, in addition to the electric power system, a switchboard (not shown) of the building. When the discharging is performed, the electric power from the electric vehicle 200 is supplied to the building via the switchboard 121.

When the discharging is performed, the converter 122 performs voltage-conversion on the AC power inputted from the electric vehicle 200 and supplies it to the switchboard 121. The converter 122 and the relay 123 are arranged in parallel (i.e., parallel connection). The relay 123 is provided in the power line PL1. A relay 124 is provided in a power line that branches off from the power line PL1 and that extends to the converter 122.

When the charging is performed, the relay 123 is placed in a closed state by the control circuit 110 and the relay 124 is placed in an open state by the control circuit 110. The AC power from the switchboard 121 is directly supplied to the electric vehicle 200 via the power line PL1 without passing through the converter 122.

When the discharging is performed, the relay 123 is placed in an open state by the control circuit 110 and the relay 124 is placed in a closed state by the control circuit 110. The AC power from the electric vehicle 200 is inputted to the converter 122 and then subject to the voltage conversion in the converter 122 and supplied to the switchboard 121. A magnitude of current drawn from the vehicle 200 is adjusted by a switching operation of the converter 122. Generally all operations of the power supply circuit 120 including the converter 122 are controlled by the control circuit 110.

An ammeter 125 and a voltmeter 126 are provided in the power line PL1. The ammeter 125 acts as a sensor that measures a current value of the AC power flowing in the power line PL1 (in other words, the AC power inputted to and outputted from the switchboard 121). The voltmeter 126 acts as a sensor that measures a voltage value of the AC power flowing in the power line PL1. Both of the current value measured by the ammeter 125 and the voltage value measured by the voltmeter 126 are always inputted to the control circuit 110.

The CPLT circuit 130 generates a CPLT signal and transmits the CPLT signal toward the electric vehicle 200. The CPLT signal is a rectangular waveform electrical signal with maximum voltage amplitude of ±12V and a frequency of 1 kHz. The CPLT circuit 130 includes a switching circuit (not shown) for generating the CPLT signal. Operations of the CPLT circuit 130 are controlled by the control circuit 110.

The CPLT circuit 130 sets a duty ratio of the CPLT signal (i.e., a time ratio between a Hi state and a Lo state) to a predetermined value to transmit an upper limit of outputtable current from the power supply station 100 to the electric vehicle 200. The voltage amplitude of the CPLT signal is changed by the electric vehicle (specifically, the below-described CPLT circuit 230); thereby, the permission of electric power output is transmitted from the electric vehicle 200 to the power supply station 100. Because general communication methods using the CPLT signal are specified in standards, further detailed description on it is not given.

A signal line SL1 is provided for transmitting the CPLT signal. One end of the signal line SL1 is connected to the CPLT circuit 130. A part of the signal line SL1 is received in the inside of the cable CB. The other end of the signal line SL1 is received in the inside of the connector CN. The signal line SL1 has multiple conducting wires. In FIG. 1, the signal line SL1 is depicted as a single line for simplicity.

The cable CB can connect the power supply station 100 and the electric vehicle 200. The connector CN is attached to a tip of the cable CB. As described above, the power line PL1 and the signal line SL1 are received in the inside of the cable CB and the inside of the connector CN. A user grips the connector CN and inserts the connector CN into an inlet IL of the electric vehicle 200 to connect the power supply station 100 and the electric vehicle 200.

A configuration of the electric vehicle 200 will be described. The electric vehicle 200 travels by a driving force of a rotary motor (not shown). The electric vehicle 200 includes an inlet IL, a control circuit 210, a battery 240 for traveling, accessory machine 270, a battery 250 for accessory machine, a charging circuit 220, and a CPLT circuit 230.

The inlet IL is a part into which the connector CN is inserted for the charging or the discharging. A power line PL2 for transmitting the AC power and a signal line SL2 for transmitting the CPLT signal are arranged inside the electric vehicle 200. One of the power line PL2 is received in an inside of the inlet IL and the other end is connected to the below-described charging circuit 220. One end of the signal line SL2 is received in the inside of the inlet IL and the other end is connected to the below-described CPLT circuit 230.

When the connector CN is inserted into the inlet IL and the connection between the power supply station 100 and the electric vehicle 200 is established via the cable CB, the power line PL1 and the power line PL2 are electrically connected and the signal line SL1 and the signal line SL2 are electrically connected.

The control circuit 210 includes a computer system including a CPU, a ROM, a RAM, and an input/output interface. The control circuit 210 controls generally whole operations of the electric vehicle 200.

The battery 240 for traveling, which corresponds to a first electricity storage, is a large capacity lithium ion battery. When the electric power stored in the battery 240 for traveling is supplied to the rotary motor (not shown), the electric vehicle 200 travels with the driving force provided by the rotary motor. In the charging, the AC power supplied from the power supply station 100 is stored in the battery 240 for traveling. In the discharging, the electric power drawn from the battery 240 for the traveling is supplied to the power supply station 100.

The accessory machine 270 includes multiple in-vehicle apparatuses (e.g., air conditioner, audio system etc.), which operate while consuming the electric power.

The battery 250 for accessory machine, which corresponds to a second electricity storage, is a lithium ion battery having a smaller capacity than the battery 240 for traveling. The battery 250 for accessory machine is equipped in the electric vehicle 200 as a battery for supplying the electric power to the accessory machine 270.

The charging circuit 220 is provided between the power line PL2 and the battery 240 for traveling. The charging circuit 220 includes a power conversion circuit (not shown). In the charging, the AC power inputted via the power line PL2 is converted into DC power by the power conversion circuit and supplied to the battery 240 for traveling. A magnitude of the current drawn from the power supply station 100 is adjusted by a switching operation of the power conversion circuit. Generally whole operations of the charging circuit 220 including the power conversion circuit are controlled by the control circuit 210.

In the discharging, the DC power inputted from the battery 240 for traveling is converted into AC power by the power conversion circuit and supplied to the power supply station 100 via the power line PL2. In this regard, it can be said that the charging circuit 220 is a discharging circuit. As described above, the magnitude of current outputted from the electric vehicle 200 in the discharging (in other words, the magnitude of current drawn into the power supply station 100) is adjusted by an operation of the converter 122 of the power supply station 100.

In the charging, the charging circuit 220 supplies the electric power to the battery 240 for traveling. In this regard, in the charging, the charging circuit 220 can also supply the electric power to the battery 250 for accessory machine. As shown in FIG. 1, one end of a power line extending from the battery 250 for accessory machine is connected to a middle of a power line that connects the charging circuit 220 and the battery 240 for traveling. A converter 260 is provided in the power line that extends from the battery 250 for accessory machine. In other words, the converter 260 is connected between the battery 250 for accessory machine and the charging circuit 220.

The DC power outputted from the charging circuit 220 toward the battery 240 for traveling is subject to voltage conversion in the converter 260 and is supplied to the battery 250 for accessory machine. The magnitude of current supplied from the charging circuit 220 to the battery 250 for accessory machine is adjusted by a switching operation of the converter 260. When the converter 260 is in an operation-stop state, the electric power is not supplied to the battery 250 for accessory machine.

The ammeter 225 and the voltmeter 226 are provided in the power line PL2. The ammeter 225 acts a sensor that measures a current value of the AC power flowing in the power line PL2. The voltmeter 226 acts a sensor that measures a voltage value of the AC power flowing in the power line PL2. Both of the current value measured by the ammeter 225 and the voltage value measured by the voltmeter 226 are always inputted to the control circuit 210.

The CPLT circuit 230 receives the CPLT signal from the power supply station 100. The CPLT circuit 230 includes a resistor and a relay (both not shown). A switching operation of the relay changes voltage amplitude of the CPLT signal; thereby, a connection state of the cable CB is transmitted to the power supply station 100. An operation of the CPLT circuit 230 is controlled by the control circuit 210. Various information (e.g., duty ratio etc.) on the CPLT signal received by the CPLT circuit 230 is inputted to the control circuit 210.

A communication method in the charging will be described with reference to FIG. 2. Specifically, a method of transmitting information from the electric vehicle 200 to the power supply station 100 when the electric power is supplied from the power supply station 100 to the electric vehicle 200 will be described. In the below, explanation is given on an example in which an information group IF0 represented by three numerical values "0, 1, 1" and an information group IF1 represented by three numerical values "0, 0, 1" are transmitted sequentially from a time to.

Each information group IF0, IF1 expresses a state of charge (SOC) of the battery 240 for traveling in binary form so that each information group IF0, IF1 has three separated numerical values (each being 0 or 1). The control circuit 210 prepares this information (first preparation) before transmitting.

It is noted that the above information is merely an example and other information may be generated and transmitted. In other words, the below-described communication method can transmit information other than the SOC information to the power supply station 100. Although a length of information to be sent is three digits in the above example, the length of information is not limited to this example.

In the present embodiment, a correspondence relationship (corresponding to a first correspondence relationship) between AC current values (also called hereinafter charging current value) drawn from the power supply station 100 by the electric vehicle 200 and numerical values transmitted from the electric vehicle 200 to the power supply station 100 is predetermined. Specifically, the correspondence relationship between the charging current values and the numerical values may be predetermined such that the charging current of the effective value 1A (ampere) acts as an indicator which indicates the numerical value "0" and the charging current of the effective value 2A (ampere) acts as an indicator which indicates the numerical value "1". The correspondence relationship is stored in both of the control circuit 110 of the power supply station 100 and the control circuit 210 of the electric vehicle 200.

Figure 2:
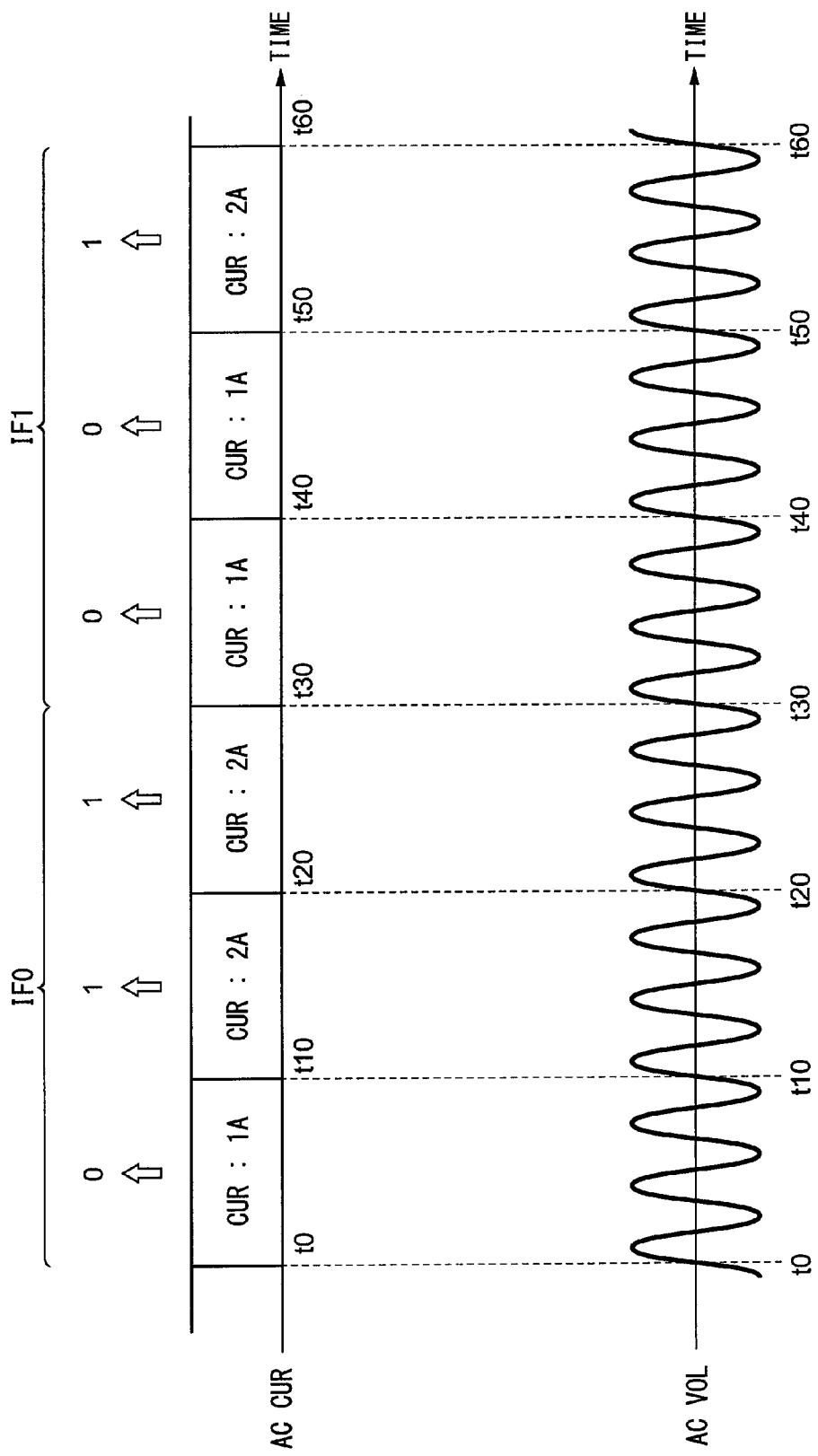
FIG. 2 is a diagram for explaining a method of transmitting information from an electric vehicle to a power supply station.

The lower side of FIG. 2 illustrates a sinusoidal wave of 50 Hz as a time change in voltage value of the power line PL1 detected by the voltmeter 126. The same time change can be observed as a time change in voltage value of the power line PL2 detected by the voltmeter 226.

At a time t0, the transmission of the information group IF0 from the electric vehicle 200 starts. This transmission corresponds to a first transmission. The time t0 is a time point where the voltage values of the power line PL1 and the power line PL2 (also called herein measured voltage values) reaches 0V. That is, the time t0 is a voltage zero crossing timing. As the first numerical value in the information group IF0 is 0, the electric vehicle 200 starts drawing the electric power of 1A from the power supply station 100. Specifically, the operation of the charging circuit 220 is controlled so that the current drawn from the power line PL1, PL2 has the effective value of 1A.

The control circuit 110 of the power supply station 100 converts the current value (1A) measured by the ammeter 125 into the numerical value 0 based on the above correspondence relationship. That is, the power supply station 100 receives "0" from the electric vehicle 200.

A time t10 comes upon elapse of three periods of the AC voltage after the time t0. At the time t10, the transmission of the second numerical value "1" in the information group IF0 starts. In the above, the time t10 is also a time when the number of detections of the voltage zero crossing after the start of the transmission of the first numerical value "0" at the time t0 reaches six. A time period until the numerical value to be transmitted is switched over (e.g., three periods of the AC voltage) is predetermined and set in both of the power supply station 100 and the electric vehicle 200.

Therefore, based on the current value detected by the ammeter 125 after the time t10, the control circuit 110 of the power supply station 100 receives "1" from the electric vehicle 200. A time point when the number of detections of the voltage zero crossing after the start of the transmission of the numerical value reaches six acts as a separation of the numerical values transmitted and received. That is, transmission and reception timing is synchronized using the voltage zero crossing timing.

The timing acting as the separation of the numerical values transmitted and received can be modified. For example, a time point when the number of detections of the voltage zero crossing after the start of the transmission of the numerical value reaches two may be used as the separation of the numerical values.

The time t20 comes when the number of times the voltage zero crossing is detected after the time t10 reaches six. At the time t20, the transmission of the third numerical value in the information group IF0 starts. Based on the current value detected by the ammeter 125 after the time t20, the control circuit 110 of the power supply station 100 receives "1" from the electric vehicle 200. The transmission and reception of this numerical value continues until at time t30 at which the number of detections of the voltage zero crossing reaches six.

After the time t30, the transmission and reception of the information group IF1 are performed in the same way as the transmission and reception of the information group IF0. It can be said that the information group IF0 is a group of numerical values transmitted in a time period from the time t0 to the time t30, where the time period from the time t0 to the time t30 is duration of nine periods of the AC voltage.

A time point where the number of times the voltage zero crossing is detected after the start of transmission of the information group IF0 reaches eighteen acts as a separation of the information groups transmitted and received. Specifically, the information group IF0 and the information group IF1 are separated from each other using the voltage zero crossing timing.

Because the electric vehicle 200 performs the transmission in the above way, the electric vehicle 200 transmits a block of information (e.g., IF0, IF1) in a time period until the number of detections of the voltage zero crossing of the AC power reaches a predetermined number of times (six times).

At time t60, the transmission and reception of the information group IF1 is completed. After the time t60, transmission of and reception of other information groups are performed in the same way as described above.

The information groups IF0 and IF1 may be separated based on the voltage zero crossing timing, as described above. Alternatively, the information groups may be separated by using what is called a start bit represented by a specific current value.

Figure 3:
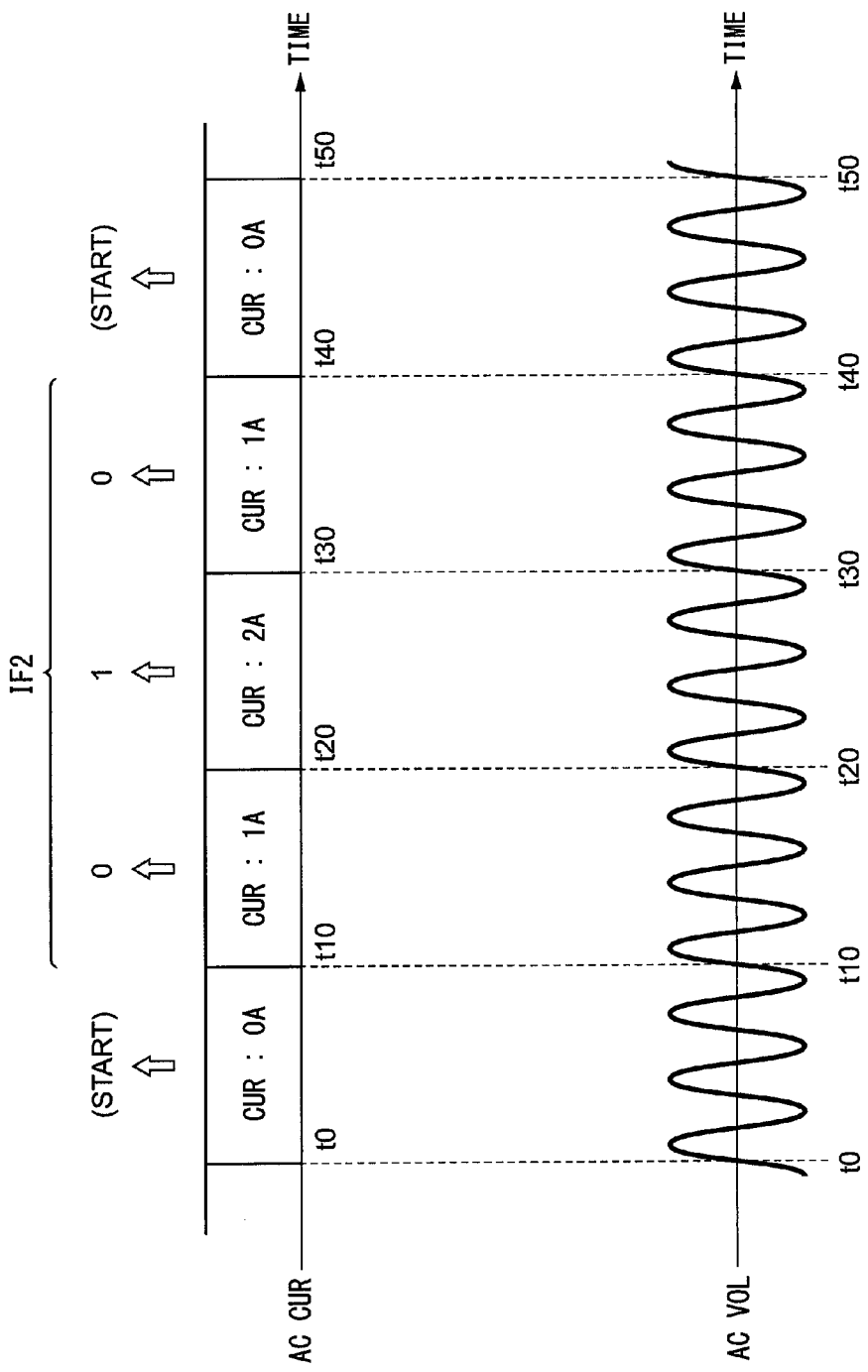
FIG. 3 is a diagram for explaining a method of transmitting information from an electric vehicle to a power supply station.

FIG. 3 shows an example in which when an information group IF2 having three numerical values "0, 1, 0" is transmitted, information representing the start bit is transmitted before and after the information group IF2.

In this connection, both of the control circuit 110 and the control circuit 210 are configured so that the charging current of the effective value 0A acts as an indicator which indicates start of transmission of the information group (e.g., IF2). This charging current of the effective value 0A is also referred to as a start information. The transmission and reception of the start information is performed in the same way as the transmission and reception of numerical values of the information group IF2.

Prior to transmission of the information group IF2, the start information is transmitted. Specifically, at a time t0 where the measured voltage value becomes 0V (zero crossing timing), the current value drawn by the electric vehicle 200 is placed at 0A. This state is maintained during duration of three periods of the AC voltage.

The time t10 comes when the number of detections of the voltage zero crossing after the time t0 reaches six. At the time t10, the transmission of the information group IF2 starts. The control circuit 110 of the power supply station 100 is configured to process, as a single information group (e.g., IF2), a group of numerical values received in a time period from reception of the start information to reception of a next start information.

When the specific current value is predetermined as the start information in the above way, it becomes possible to transmit and receive an information group having a various length (i.e., the total number of numerical values) between the power supply station 100 and the electric vehicle 200.

Figure 4:
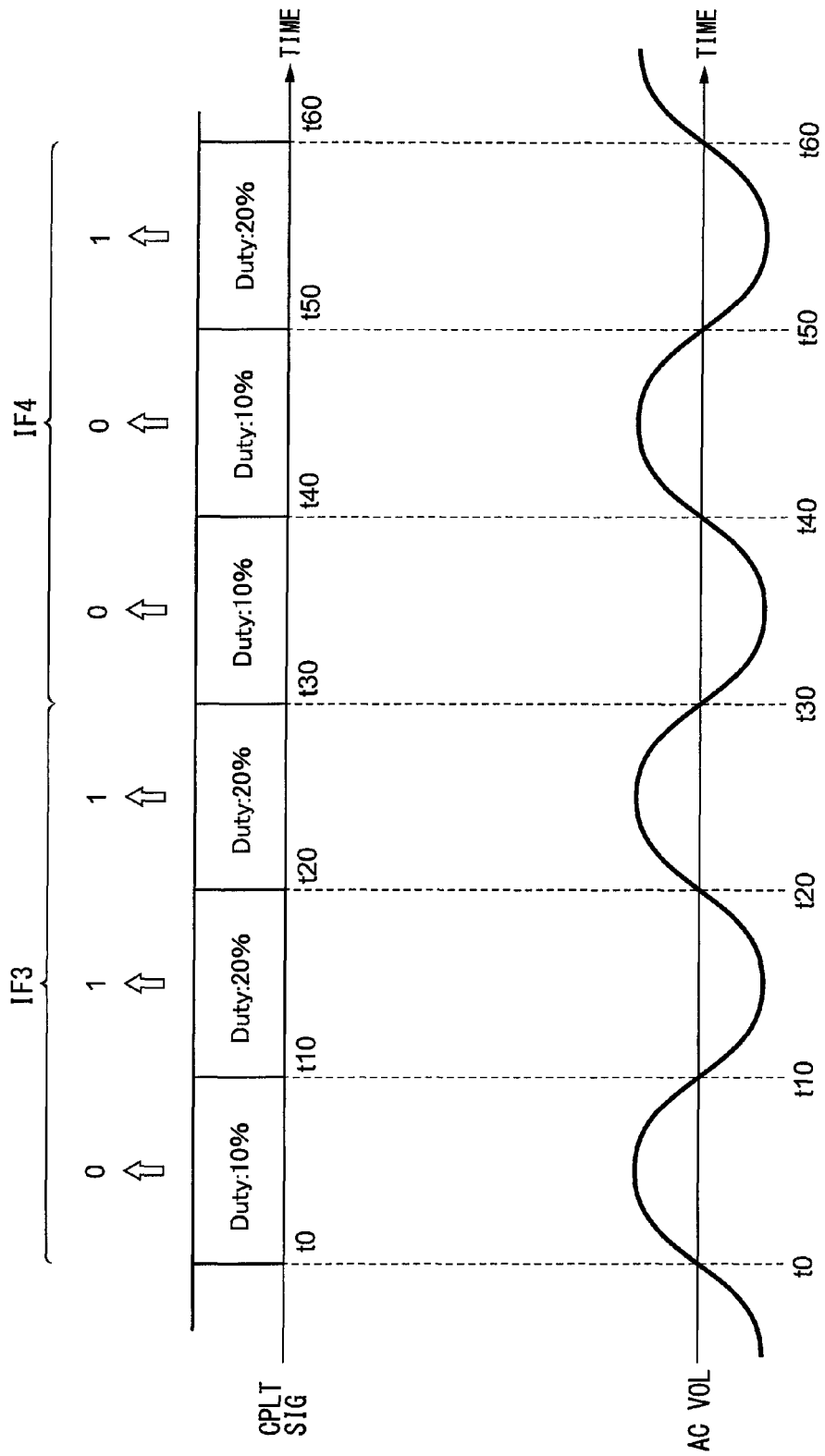
FIG. 4 is a diagram for explaining a method of transmitting information from a power supply station to an electric vehicle.

With reference to FIG. 4, explanation will be given on a method of transmitting information from the power supply station 100 to the electric vehicle 200 during supply of the electric power from the power supply station 100 (i.e., during the charging). In the below example, it is assumed that an information group IF3 represented by three numerical values "0, 1, 1" and an information group IF4 represented by three numerical values "0, 0, 1" are transmitted sequentially from the time t0.

The information groups IF3, IF4 show a time left until electricity rate (prices) is changed to high. The information groups IF3, IF4 express this time in binary form. In each information group IF3, IF4, there are three separated numerical values (each 0 or 1). The information be transmitted is generated by the control circuit 110 (i.e., second preparation) prior to the transmission of the information.

It is noted that the above information is merely an example and the information generated and transmitted is not limited to a specific example. That is, the information other than the above time left can be transmitted to the electric vehicle 200 in the below communication method. Additionally, the length of information to be transmitted (e.g., the number of digits in the present embodiment) is not limited to a specific example.

In the present embodiment, a correspondence relationship between duty ratio values (also referred to simply as duty ratios) of a CPLT signal transmitted from the power supply station 100 to the electric vehicle 200 and numerical values transmitted from the power supply station 100 to the electric vehicle 200 are predetermined. This correspondence relationship is also called a second correspondence relationship. The correspondence relationship between the duty ratio values and the numerical values may be predetermined such that the duty ratio of 10% indicates the numerical value "0" and the duty ratio of 20% indicates the numerical value "1". This correspondence relationship is stored in both of the control circuit 110 of the power supply station 100 and the control circuit 210 of the electric vehicle 200.

The lower side of the FIG. 4 shows a sinusoidal wave having 50 Hz as a time change in voltage values of the power line PL2 detected by the voltmeter 226. The same time change is also observed as a time change in voltage value of the power line PL1 detected by the voltmeter 126.

The time t0 is a zero crossing time where the voltage values of the power line PL1 and the power line PL2 (measured voltage values) reach 0V. At the time t0, the transmission of the information group IF3 from the power supply station 100 (corresponding to a second transmission) starts. Because the first numerical value in the information group IF3 is 0, the power supply station 100 starts transmitting the CPLT signal with the duty ratio 10% to the electric vehicle 200. Specifically, the operation of the CPLT circuit 130 is controlled so that the CPLT signal transmitted via the signal lines SL1, SL2 has the duty ratio of 10%.

The control circuit 210 of the electric vehicle 200 coverts the duty ratio 10% of the CPLT signal, which is received by the CPLT circuit 230, into the numerical value "0" based on the correspondence relationship. That is, the electric vehicle 200 receives "0" from the power supply station 100 (corresponding to a second reception).

The time t10 comes upon elapse of one half period of the AC voltage after the time t0. At the time t10, the transmission of the second numerical value "1" in the information group IF3 starts. It can be said that the time t10 is a time where a next voltage zero crossing after the start of transmission of the first numerical value "0" at the time t0 is detected. A time period until the numerical value to be transmitted is switched over is predetermined (e.g., duration of one half of the AC voltage in the present embodiment) and is set and stored in both the power supply station 100 and the electric vehicle 200.

Therefore, the control circuit 210 of the electric vehicle 200 receives "1" from the power supply station 100, based on the duty ratio (e.g., 20%) of the CPLT signal received by the CPLT circuit 230 after the time t10. A time point where the voltage zero crossing is again detected after the start of transmission of the numerical value acts as a separation of numerical values to be received and transmitted. Specifically, in the transmission of information from the power supply station 100 to the electric vehicle 200, the transmission and reception timing is synchronized using the voltage zero crossing timing. The timing acting as the separation of numerical values transmitted and received may be modified. For example, a time point where the voltage zero crossing is detected twice after the start of transmission of the numerical value may be used as the separation of numerical values transmitted and received.

The time t20 comes when the voltage zero crossing is detected after the time t10. At the time t20, the transmission of the third numerical value "1" in the information group IF3 starts. The control circuit 210 of the electric vehicle 200 receives "1" from the power supply station 100, based on the duty ratio (e.g., 20%) of the CPLT signal received by the CPLT circuit 230 after the time t20. The transmission and reception of this numerical value continues until a next voltage zero crossing is detected at the time t30.

After the time t30, the transmission and reception of the information group IF4 is performed in the same way as the above-described transmission and reception of the information group IF3. It can be said that the information group IF3 is a block of numerical values transmitted in a time period from the time t0 to the time t30, where the time period from the time t0 to the time t30 is duration of one and half periods of the AC voltage.

A time point where the number of times the voltage zero crossing is detected after the start of the transmission of the information group IF3 reaches three acts as a separation of information groups transmitted and received. In other words, the information group IF3 and the information group IF4 are separated from each other using the voltage zero crossing timing.

To perform the transmission in the above way, the power supply station 100 is configured to process a block of an information group in a time period until the number of detections of voltage zero crossing of the AC power reaches a predetermined number of times (e.g., three times).

At a time t60, the transmission and reception of the information group IF4 is completed. After the time t60, transmission and reception of other information groups are repeatedly performed in the same way as described above.

The information groups IF3 and IF4 may be separated based on the voltage zero crossing timing, as described above. Alternatively, the information groups may be separated based on what is called a start bit represented by a specific duty ratio.

Figure 5:
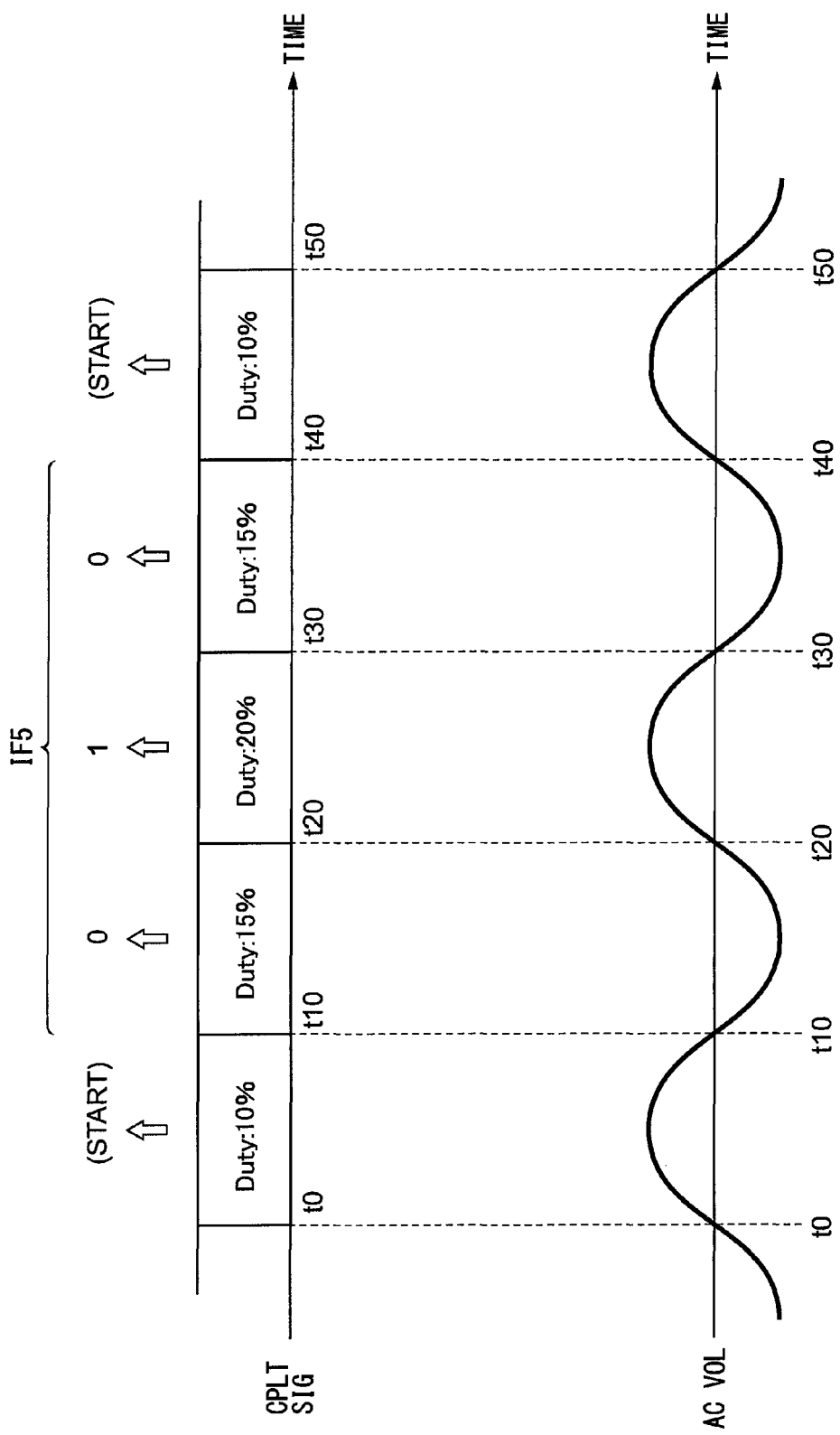
FIG. 5 is a diagram for explaining a method of transmitting information from a power supply station to an electric vehicle.

FIG. 5 shows an example in which information serving as the start bit is transmitted before and after the transmission of the information group IF5 represented by three numerical values "0, 1, 0".

In connection with example of FIG. 5, both of the control circuit 110 and the control circuit 210 are configured so that the duty ratio of 10% is used as an indicator (i.e., start information) which indicates the start of transmission of an information group (e.g., IF5). Additionally, the relationship between the duty ratios and the numerical values is defined so that the duty ratio of 15% indicates the numerical value "0" and the duty ration of 20% indicates the numerical value "1". The transmission and reception of the start information are performed in the same way as the e transmission and reception of the numerical values in the information group IF5.

Before the transmission of the information group IF5 is started, the start information is transmitted. Specifically, at a time t0 (i.e., zero crossing timing) where the measured voltage value becomes 0V, the duty ratio of the CPLT signal transmitted from the power supply station 100 to the electric vehicle 200 is set to 10%. This state continues until elapse of one half period of the AC voltage from the time t0.

At the time t10, the voltage zero crossing after the time t0 is detected and the transmission of the information group IF5 starts. The control circuit 210 of the electric vehicle 200 receives a group of numerical values (0, 1, 0 in this example) in a period between the reception of the start information and the reception of the next start information. In this regard, the control circuit 210 is configured to process this group of received numerical values as a single information group IF5.

By predefining a specific duty ratio as the start information in the above way, it becomes possible to transmit and receive information groups of various lengths (e.g., the total number of numerical values) between the power supply station 100 and the electric vehicle 200.

In the above examples, each of the information transmitted from the electric vehicle 200 (see FIG. 2) and the information transmitted from the power supply station (see FIG. 4) is a numerical value capable of expressing only two kinds of numbers, either 0 or 1. Alternatively, the information transmitted may be a numerical value capable of expressing three or more kinds of numbers.

For example, with regard to the information transmitted from the electric vehicle 200, the relationship between the charging current values and the numerical values may define that the charging current having the effective values 1A (ampere), 2A and 3A, respectively, indicate the numerical values "0", "1" and "2".

With regard to the information transmitted from the power supply station 100, the relationship between the duty ratios and the numerical values may define that the duty ratios of 10%, 20% and 30%, respectively, indicate the numerical values "0", "1" and "2".

When the numerical value capable of expressing three or more numbers is transmitted, an information density increases. Accordingly, it becomes possible to transmit and receive more information in a given period.

In the above example, the charging of the electric vehicle 200 is required in order to transmit the information from the electric vehicle 200 to the power supply station 100. Thus, there may be a concern that after the battery 240 for traveling becomes a fully-charged state, it is impossible to transmit the information.

In this regard, when the battery 240 for traveling becomes a fully-charged state, the converter 260 may start a switching operation so that the electric power drawn from the power line PL2 by the charging circuit 220 is stored not in the battery 240 for traveling but in the battery 250 for accessory machine. Accordingly, after the battery 240 for traveling becomes a fully-charged state, it is possible to continuously perform the communication.

Incidentally, according to the CPLT communication standard, an upper limit of the current transmitted from the power supply station 100 to the electric vehicle 200 is a large value of 6A or more and the settable upper limit of the current has a minimum value of 6A. Therefore, as long as the electric vehicle 200 charges the drawn current in a range of =<6A, there is no possibility that the drawn current exceeds the upper limit of the current.

Therefore, it may be preferable to define the correspondence relationship between the charging current values and the numerical values so that when the information is transmitted from the electric vehicle 200 to the power supply station 100, the charging current value always stays below 6A. In this configuration, the electric vehicle 200 can transmit the information without monitoring the upper limit of current transmitted from the power supply station 100, and therefore, the load on the control circuit 210 can be reduced.

The above example describes the communication method performed when the power supply station 100 supplies the electric power to the electric vehicle 200 (i.e., when the charging is performed). When the electric vehicle 200 supplies the electric power to the power supply station 100 (i.e., when the discharging is performed), substantially the same communication method as described above can be employed.

Specifically, the power supply station 100 can transmit the information to the electric vehicle 200 by changing an effective value of the AC current drawn from the electric vehicle 200.

More specifically, the control circuit 210 of the electric vehicle 200 prepares the information to be transmitted (this preparation corresponds to a third preparation). For the communication in the discharging, a correspondence relationship (corresponding to a third correspondence relationship) between AC current values (also called "discharging current value") drawn from the electric vehicle 200 by the power supply station 100 and numerical values transmitted from the power supply station 100 to the electric vehicle 200 is predetermined. For example, the relationship between the discharging current values and the numerical values is defined so that the discharging current of an effective value 1A indicates the numerical value "0", and the discharging current of an effective value 2A indicates the numerical value "1".

At a time t0 where the voltage values of the power line PL1 and the power line PL2 become 0V (i.e., zero crossing timing), the transmission of an information group (e.g., a group of numerical values each being 0 or 1) from the power supply station 100 starts (corresponding to third transmission). The control circuit 210 of the electric vehicle 200 converts the current value detected by the ammeter 225 into the numerical value of 0 or 1 based on the correspondence relationship. That is, the electric vehicle 200 receives the numerical value from the power supply station 100 (corresponding to third reception). In the above, the magnitude of the current drawn into the power supply station 100 is adjusted by a switching operation of the converter 122.

In the communication in the discharging also, a time point where the voltage zero crossing is detected can be used to separate numerical values and numerical value groups in the same manner as in the communication in the charging.

Additionally, in the communication in the discharging, a specific numerical value (e.g., 0A) can be used to separate information groups (e.g., IF0, IF1) in the same manner as in the communication in the charging.

Although embodiments have been illustrated with reference to specific examples, the embodiments are not limited to these specific examples. The specific examples can be modified in various ways. For example, an arrangement, a material, a condition, a shape and a size of each technical element in the above examples can be modified. Additionally, technical elements in different examples can be combined when they are technically combinable.

What is claimed is:

1. A method of communication between a power supply station and an electric vehicle, the method comprising:
    performing a first preparation in which the electric vehicle prepares a first information represented by a numerical value to be transmitted to the power supply station;
    performing a first transmission in which the electric vehicle transmits the first information by causing an AC power, which the electric vehicle draws from the power supply station, to have a current value corresponding to the first information based on a predetermined first correspondence relationship;
    performing a first reception in which the power supply station receives the first information based on a magnitude of the current drawn by the electric vehicle and the first correspondence relationship;
    performing a second preparation in which the power supply station prepares a second information represented by a numerical value to be transmitted to the electric vehicle;
    performing a second transmission in which the power supply station transmits the second information by causing a CPLT signal, which is transmitted to the electric vehicle, to have a duty ratio corresponding to the second information based on a predetermined second correspondence relationship; and
    performing a second reception in which the electric vehicle receives the second information based on the duty ratio of the CPLT signal transmitted from the power supply station and the second correspondence relationship.

2. The method of communication according to claim 1, wherein:
    at a time when a number of times a voltage zero crossing of the AC power is detected after start of transmission of the first information reaches a predetermined number of times, the electric vehicle starts transmitting a next first information.

3. The method of communication according to claim 1, wherein:
    the electric vehicle transmits a plurality of the first informations as a first information group; and
    the electric vehicle starts transmitting the first information group after causing the AC power to have a specific current value that is predetermined to indicate start of the transmission of the first information group.

4. The method of communication according to claim 1, wherein:
    the electric vehicle transmits a plurality of the first informations as a first information group; and
    the electric vehicle transmits the first information group in a time period until a number of times a voltage zero crossing of the AC power is detected reaches a predetermined number of times.

5. The method of communication according to claim 1, wherein:
    the electric vehicle is equipped with a first electricity storage storing electric power for traveling and a second electricity storage storing electric power for auxiliary machine; and
    when the first electricity storage becomes a fully-charged state, the electric vehicle stores in the second electricity storage the AC power drawn from the power supply station and continues performing the communication with the power supply station.

6. The method of communication according to claim 1, wherein
    at a time when a number of times a voltage zero crossing of the AC power is detected after start of transmission of the second information reaches a predetermined number of times, the power supply station starts transmitting a next second information.

7. The method of communication according to claim 1, wherein:
    the power supply station transmits a plurality of the second informations as a second information group; and
    the power supply station starts transmitting the second information group after causing the CPLT signal to have a specific duty ratio that is predetermined to indicate start of the transmission of the second information group.

8. The method of communication according to claim 1, wherein:
    the power supply station transmits a plurality of the second informations as a second information group; and
    the power supply station transmits the second information group in a time period until a number of times a voltage zero crossing of the AC power is detected reaches a predetermined number of times.

* * * * *